United States Patent [19]

Shoji et al.

[11] Patent Number: 5,443,930
[45] Date of Patent: Aug. 22, 1995

[54] NONAQUEOUS ELECTROLYTE BATTERY

[75] Inventors: Yoshihiro Shoji; Mikiya Yamasaki; Koji Nishio, all of Hirakata; Toshihiko Saito, Tsuzuki, all of Japan

[73] Assignee: Sanyo Electric Co., Ltd., Osaka, Japan

[21] Appl. No.: 285,009

[22] Filed: Aug. 2, 1994

[30] Foreign Application Priority Data

Aug. 3, 1993 [JP] Japan .................. 5-212323

[51] Int. Cl.$^6$ .............................................. H01M 4/50
[52] U.S. Cl. .................................... 429/224; 429/194; 429/197; 429/232
[58] Field of Search ............... 429/224, 232, 197, 217, 429/218; 136/83 R

[56] References Cited

U.S. PATENT DOCUMENTS

| | | | |
|---|---|---|---|
| 3,892,590 | 7/1975 | Gunther | 136/83 R |
| 4,327,166 | 4/1982 | Leger | 429/194 |
| 4,548,881 | 10/1985 | Nalewajek et al. | 429/194 |
| 4,804,595 | 2/1989 | Bakos et al. | 429/194 |
| 5,180,642 | 1/1993 | Weiss et al. | 429/90 |

FOREIGN PATENT DOCUMENTS 0049082 7/1982 European Pat. Off. .
57-88671 6/1982 Japan .

OTHER PUBLICATIONS

Patent Abstracts of Japan, vol. 12, No. 412, JP 63-150855 (1988) (abstract) Jun. 1988.
Database WPI, Week 8118, 1981, JP 56024761 (abstract) Mar. 1981.
Database WPI, Week 8203, 1982, JP 56156669 (abstract) Dec. 1981.
Patent Abstracts of Japan, vol. 13, No. 354, JP 01-115063 (1989) (abstract) May 1989.

Primary Examiner—Stephen Kalafut
Assistant Examiner—Richard H. Lilley, Jr.
Attorney, Agent, or Firm—Birch, Stewart, Kolasch & Birch

[57] ABSTRACT

A nonaqueous electrolyte battery comprises a positive electrode comprising a mixture of manganese dioxide and a fluorinated graphite as a positive electrode active material, a negative electrode comprising lithium metal or a substance capable of occluding and discharging lithium ion as a negative electrode material, and a nonaqueous electrolyte, said fluorinated graphite being represented by the formula (CFx)n wherein $1.2 \leq X \leq 1.4$ and contained in said mixture in a ratio by weight of 0.1 to 4%. This battery undergoes minimal self discharge and has excellent storage capability, since reaction products formed by reaction of manganese dioxide and the nonaqueous electrolyte used minimally react with lithium on the negative electrode side.

6 Claims, 3 Drawing Sheets

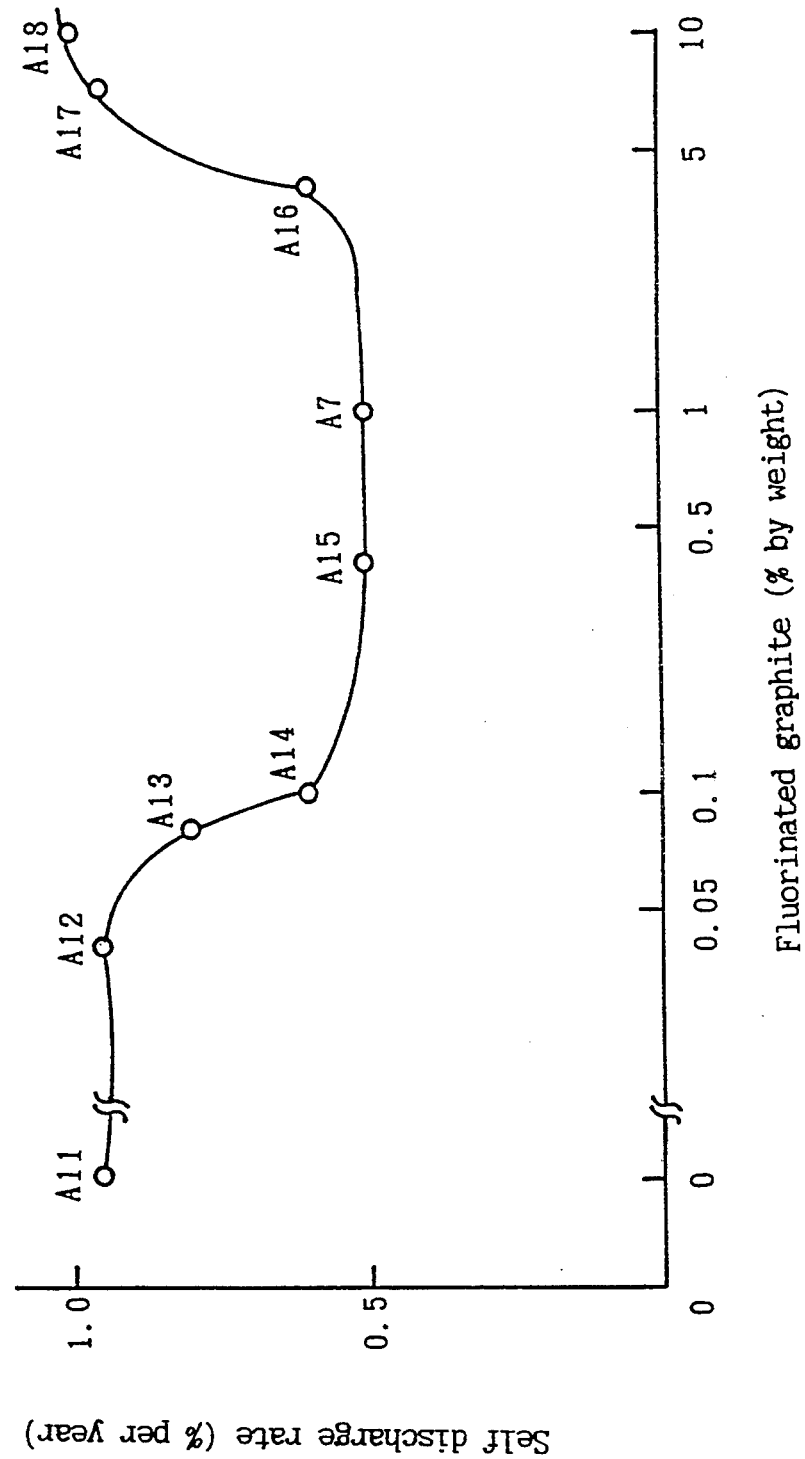

NONAQUEOUS ELECTROLYTE BATTERY

BACKGROUND OF THE INVENTION

This application claims the priority of Japanese Patent Application No. 5-212323 filed on Aug. 3, 1993, which is incorporated herein by reference.

1. Field of the invention

The present invention relates to a nonaqueous electrolyte battery and, more specifically, to improvement of positive electrode active material to improve the storage capability.

2. Description of the prior art

Lithium batteries (primary battery) have the advantages of ①higher weight energy density compared to conventional alkali batteries, ②achievement of high operating voltages of 3 to 4 V by selecting an appropriate positive electrode active material, and ③good storage capability thanks to formation of a thin protective film having ionic conductivity on the surface of lithium negative electrode as caused by reaction with the electrolyte used (aprotic organic solution). Lithium batteries have, therefore, been widely used as power source for watches, electronic calculators, cameras, instruments and the like.

Among lithium batteries, manganese dioxide-lithium batteries, having manganese dioxide as a positive electrode active material, are currently produced in the largest volume, since they have better battery characteristics compared to other lithium batteries and are advantageous in raw material cost due to the low price of manganese oxide.

However, with conventional manganese dioxide-lithium batteries, the manganese oxide reacts with the electrolyte used during storage and the resulting reaction products further react with the lithium on the negative electrode side so that the batteries undergo self discharge (self discharge rate: about 1%/year). These batteries are therefore not provided with satisfactory storage capability.

As a result of an intensive study, the present inventors have found that the storage capability markedly improves when a fluorinate graphite having a specific fluorine content is added to manganese dioxide in a specific amount.

Japanese Patent Application Laid-open No. 88671/1982 proposes a nonaqueous electrolyte battery utilizing a mixture of manganese dioxide and a fluorinated graphite as a positive electrode active material. However, the fluorinated graphite used in the battery proposed by this application has a relatively low fluorine content. Thus, the compound is represented by formula (CyFx)n wherein y is 1 or 2 and x is not more than about 1.1. With respect to storage capability which the present invention intends to improve, this type battery is of the same level as the above mentioned conventional manganese dioxide-lithium batteries utilizing manganese-dioxide alone.

SUMMARY OF THE INVENTION

Accordingly, an object of the present invention is provide a nonaqueous electrolyte battery having good storage capability.

The present invention provides a nonaqueous electrolyte battery comprising:

a positive electrode comprising a mixture of manganese dioxide and a fluorinated graphite as a positive electrode active material, a negative electrode comprising lithium metal or a substance capable of occluding and discharging lithium ion as a negative electrode material, and a nonaqueous electrolyte, said fluorinated graphite being represented by the formula (CFx)n wherein $1.2 \leq X \leq 1.4$ and contained in said mixture in a ratio by weight of 0.1 to 4%.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 3 is a graph showing the relationship between the self discharge rate and the weight ratio of the fluorinated graphite.

DETAILED DESCRIPTION OF THE PREFERRED EMBODIMENTS

Figure 1:
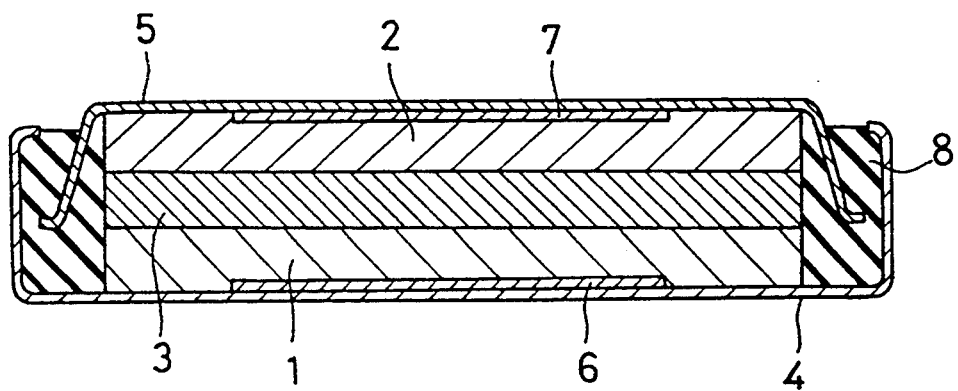
FIG. 1 is a schematic cross-sectional view of a flat-type nonaqueous electrolyte battery assembled in the Examples that will be described later herein.

In the present invention, the x value in formula (CFx)n is restricted within the range of 1.2 to 1.4 and the content of the fluorinated graphite in the mixture of the fluorinated graphite and manganese oxide within the range of 0.1 to 4% by weight. Otherwise, the self discharge increases and the storage capability decreases, as seen from the Examples to be described later herein.

Examples of the substances that are usable for negative electrode in the present invention and capable of occluding and discharging lithium ion include alloys of lithium with other alkali metals or alkali earth metals, metal oxides such as iron oxide, tangsten oxide and niobium oxide and carbon materials such as coke and graphite. The negative electrode material, however, is not limited to the above, and may be any other substance that has high activity and hence readily reacts with products of reaction of manganese oxide with nonaqueous electrolyte, since the effect of the present invention is produced for that type substance.

Examples of nonaqueous electrolytes usable in the present invention include, among others, solutions of $LiPF_6$, $LiClO_4$, $LiCF_3SO_3$ dissolved in an organic solvent such as ethylene carbonate, vinylene carbonate or propylene carbonate, or mixed solvents of the foregoing with a low-boiling-point solvent such as dimethyl carbonate, diethyl carbonate, 1,2-dimethoxyethane, 1,2-diethoxyethane or ethoxymethoxyethane.

With the positive electrode of the battery of the present invention, a fluorinated graphite having a specific fluorine content has been added to manganese dioxide. As a result, reaction products formed by reaction of manganese dioxide with the nonaqueous electrolyte used are captured by the fluorinated graphite, so that the reaction products minimally react with lithium present on the negative electrode side, i.e. minimally undergo self discharge.

EXAMPLES

Other features of the invention will become apparent in the course of the following descriptions of exemplary embodiments which are given for illustration of the invention and are not intended to be limiting thereof.

Preparation Examples 1 through 10

Flat-type nonaqueous electrolyte batteries according to the present invention were prepared as follows.

Preparation of positive electrodes

Ten positive electrode materials were obtained by mixing:
- each one of mixtures, as positive electrode active materials, of manganese dioxide ($MnO_2$) and a fluorinated graphite (CFx) n (x=0.6, 0.8, 0.9, 1.0, 1.1, 1.2, 1.3, 1.4, 1.5 or 1.6) [(CFx) n×100/($MnO_2$+(CFx) n)=1% by weight],
- graphite as a conductive agent, and
- polytetrafluoroethylene (PTFE) as a binder, in a ratio by weight of 90:5:5. Here, the above fluorinated graphites were prepared by permitting natural graphite powder to react with fluorine gas (partial pressure of fluorine gas: 0.5 atm.) at a temperature of 300° to 550° C. for 1 hour, where the fluorination ratio x was adjusted by adjusting the reaction temperature. On this occasion, it is possible to use coke, charcoal or activated carbon, instead of natural graphite powder. The positive electrode materials obtained were pressed into disc-shaped positive electrodes. Stainless steel plate (SUS304) was used as a positive electrode collector.

Preparation of negative electrode

A sheet of lithium rolled plate was punched into discs having a prescribed size, to prepare disc-shaped negative electrodes. Stainless steel plate (SUS304) was used as a negative electrode collector.

Preparation of nonaqueous electrolyte

In a 1/1 by volume mixed solvent of propylene carbonate (PC) and 1,2-dimethoxyethane (DME), lithium perchlorate ($LiClO_4$) was dissolved in a concentration of 1 mole/liter, to give a nonaqueous electrolyte.

Assembly of nonaqueous electrolyte batteries (primary batteries)

Nonaqueous electrolyte batteries A1 through A10 were assembled using the above positive electrodes and the negative electrode and nonaqueous electrolyte (battery size: diameter: 20 mm, height: 2.5 mm; theoretical battery capacity: about 130 mAh). A microporous polypropylene film having a good ion permeability (CELGARD 3401, made by Polyplastics Co., Ltd.) was used as a separator and impregnated with the above nonaqueous electrolyte.

FIG. 1 is a schematic cross-sectional view of the thus assembled nonaqueous electrolyte battery A1 (as well as A2 through A10). In the FIGURE, the nonaqueous electrolyte battery A1 consists of a positive electrode 1, negative electrode 2, a separator 3 placed between the two electrodes, a positive electrode can 4, a negative electrode can 5, a positive electrode collector 6, a negative electrode collector 7, a polypropylene insulating packing 8 and other parts. The positive electrode 1 and negative electrode 2 are, while facing each other via the separator 3 impregnated with the nonaqueous electrolyte, housed in a battery case formed by the positive and negative electrode cans 4 and 5. The positive electrode 1 is connected to the positive electrode can 4, via the positive electrode collector 6, and the negative electrode 2 to the negative electrode can 5, via the negative electrode collector 7, so that the chemical energy generated in the battery can be taken out as electric energy from the terminals of the positive and negative electrode cans 4 and 5.

Preparation Examples 11 through 18

Nonaqueous electrolyte batteries A11 through A18 were assembled in the same manner as in Preparation Examples 1 through 10, except that there were used, as positive electrode active materials, manganese dioxide alone or mixtures of manganese dioxide with a fluorinated graphite $(CF_{1.3})n$ [$(CF_{1.3})n \times 100/(MnO_2+(CF_{1.3})n$=0.04, 0.08, 0.1, 0.4, 1, 4, 8 or 10% by weight in this order].

Storage capability

The nonaqueous electrolyte batteries obtained in Preparation Examples 1 through 18 were measured for initial discharge capacity and discharge capacity after being stored at 60° C. for 60 days (this condition corresponds to storage at room temperature for 3 years). The self discharge rates were calculated by the following formula. The discharge test was conducted at 25° C. and a constant resistance of 5 kΩ.

Self discharge rate (%/year) =

(initial discharge capacity − discharge capacity after storage) ×

100/(initial discharge capacity × 3)

Figure 2:
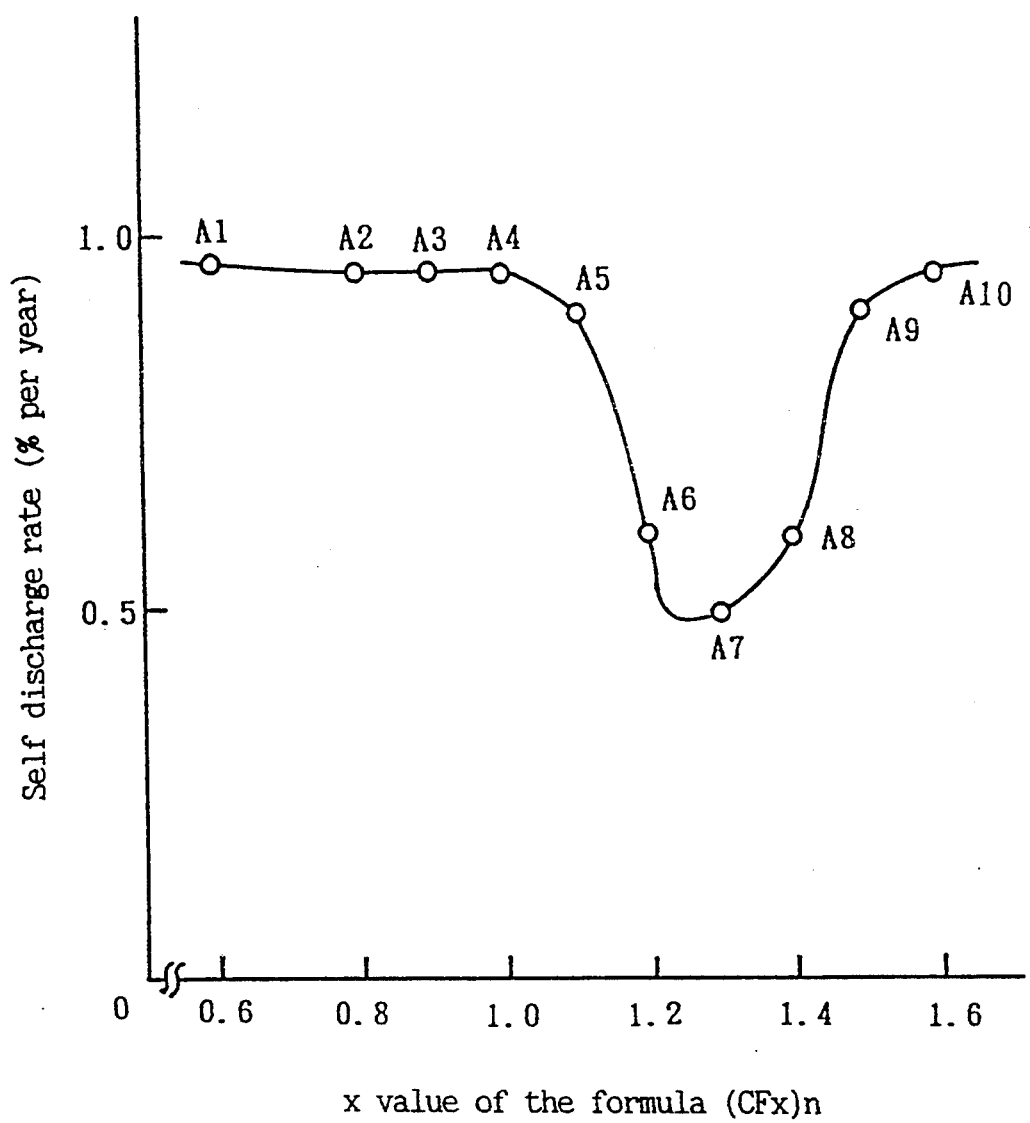
FIG. 2 is a graph showing the relationship between the x value in the formula (CFx)n representing fluorinated graphite and the self discharge rate.

FIG. 2 is a graph of the self discharge rates per year of the nonaqueous electrolyte batteries A1 through A10 obtained in Preparation Examples 1 through 10, with the ordinate representing the self discharge rate (%/year) and the abscissa the x value in the formula (CFx) n representing the fluorinated graphite used for the positive electrode of each battery. FIG. 3 is a graph of the self discharge rates per year of the nonaqueous electrolyte batteries A11 through A18 obtained in Preparation Examples 11 through 18, with the ordinate representing the self discharge rate (%/year) and the abscissa the weight ratio (%) of the fluorinated graphite $(CF_{1.3})n$ used for the positive electrode of each battery. FIG. 3 also shows the self discharge rate of the nonaqueous electrolyte battery A7, by copying from FIG. 2.

It is understood from FIG. 2 that use of fluorinated graphites of formula (CFx)n with the x being in the range of 1.2 to 1.4 gives nonaqueous electrolyte batteries having good storage capability, i.e. having a self discharge rate of 0.5 to 0.6%/year.

It is understood from FIG. 3 that use of fluorinated graphites in a ratio by weight of 0.1 to 4% gives nonaqueous electrolyte batteries having good storage capability, i.e. having a low self discharge rate.

Preparation Examples 19 through 30

A positive electrode material was obtained by mixing:
- a mixture, as positive electrode active material, of manganese dioxide ($MnO_2$) and a fluorinated graphite (CFx)n (x=1.3) [(CFx)n ×100/($MnO_2$+(CFx)n)=1% by weight],
- graphite as a conductive agent, and
- polytetrafluoroethylene (PTFE) as a binder, in a ratio by weight of 90:5:5. The positive electrode material obtained was pressed into disc-shaped positive electrodes. Stainless steel plate (SUS304) was used as a positive electrode collector.

Nonaqueous electrolyte batteries A19 through A30 were assembled in the same manner as in Preparation Examples 1 through 10, using the above positive electrodes and the negative electrodes and nonaqueous electrolytes shown in Table 1. The batteries obtained were tested for self discharge rate per year in the same manner. The results are shown in Table 1.

TABLE 1

| Battery | Electrolyte Solvent (ratio by volume) | Solute | Negative electrode | Self discharge rate* (%/year) |
|---|---|---|---|---|
| A19 | PC/DME (50/50) | 1MLiCF$_3$SO$_3$ | Li | 0.4 |
| A20 | PC/DME (50/50) | 1MLiPF$_6$ | Li | 0.6 |
| A21 | PC/DME (50/50) | 1MLiBF$_4$ | Li | 0.7 |
| A22 | BC/DME (50/50) | 1MLiCF$_3$SO$_3$ | Li | 0.4 |
| A23 | BC/DME (50/50) | 1MLiCF$_3$SO$_3$ | Li | 0.4 |
| A24 | EC/PC/DME (25/25/50) | 1MLiCF$_3$SO$_3$ | Li | 0.3 |
| A25 | EC/BC/DME (25/25/50) | 1MLiCF$_3$SO$_3$ | Li | 0.3 |
| A26 | EC/DMC (50/50) | 1MLiPF$_6$ | Li | 0.4 |
| A27 | EC/DEC (50/50) | 1MLiPF$_6$ | Li | 0.4 |
| A28 | PC/DMC (50/50) | 1MLiPF$_6$ | Li | 0.4 |
| A29 | PC/DEC (50/50) | 1MLiPF$_6$ | Li | 0.4 |
| A30 | PC/DME (50/50) | 1MLiCF$_3$SO$_3$ | Li—Al | 0.4 |

PC: propylene carbonate,
BC: butylene carbonate,
EC: ethylene carbonate,
DME: 1,2-dimethoxyethane,
DMC: dimethyl carbonate,
DEC: diethyl carbonate,
Li—Al: lithium-aluminum alloy (Al: 3% by weight)
*converted into those at room temperature As shown in Table 1, the nonaqueous electrolyte batteries A19 through A30 had very low self discharge rates ranging from 0.3 to 0.7%. It is understood from this fact that the present invention is applicable to nonaqueous batteries provided with various electrolytes and negative electrodes.

Although the above descriptions have been given for the nonaqueous electrolyte batteries of the present invention being of flat type, the present invention is applicable to nonaqueous electrolyte batteries of any type or shape, for example cylindrical type and square pillar type, with no particular restrictions.

Likewise, although the above Examples deal with primary batteries, the present invention is applicable to secondary batteries, too.

As described so far, the nonaqueous electrolyte batteries according to the present invention minimally undergo self discharge because reaction products formed by reaction of manganese dioxide and the nonaqueous electrolyte used minimally react with lithium on the negative electrode side, and hence the batteries exhibit excellent storage capability. The batteries of the present invention are suitably used, in particular, as power source of housed-in type for those instruments or the like that must stand long-period use.

Obviously, numerous modifications and variations of the invention are possible in light of the above teachings. It is therefore to be understood that within the scope of the appended claims, the invention may be practiced otherwise than as specifically described herein.

What is claimed is:

1. A nonaqueous electrolyte battery comprising:
   a positive electrode comprising a mixture of manganese dioxide and a fluorinated graphite as a positive electrode active material,
   a negative electrode comprising lithium metal or a substance being capable of occluding and discharging lithium ions as a negative electrode material,
   and
   a nonaqueous electrolyte, said fluorinated graphite being represented by the formula (CFx)n wherein $1.2 \leq x \leq 1.4$ and contained in said mixture in a ratio by weight of 0.1 to 4%.

2. The nonaqueous electrolyte battery according to claim 1, wherein said substance being capable of occluding and discharging lithium ions is a member selected from the group consisting of lithium alloys, metal oxides and carbon materials.

3. The nonaqueous electrolyte battery according to claim 1, wherein said nonaqueous electrolyte is a solution of LiCF$_3$SO$_3$.

4. The nonaqueous electrolyte battery according to claim 1, wherein said nonaqueous electrolyte uses a solvent of a mixture of ethylene carbonate, propylene carbonate and 1,2-dimethoxyethane or a mixture of ethylene carbonate, butylene carbonate and 1,2-dimethoxyethane.

5. The non-aqueous electrolyte battery according to claim 1, wherein said non-aqueous electrolyte is a solution of a member selected from the group consisting of LiPF$_6$, LiClO$_4$ and LiCF$_3$SO$_3$.

6. The non-aqueous electrolyte battery according to claim 5, wherein said non-aqueous electrolyte is a solution of at least one of said members in an organic solvent selected from the group consisting of ethylene carbonate, butylene carbonate, vinylene carbonate, propylene carbonate, and mixtures thereof with dimethyl carbonate, diethyl carbonate, 1,2-dimethoxyethane, 1,2-diethoxyethane or ethoxymethoxyethane.

* * * * *